(12) United States Patent
Koseki et al.

(10) Patent No.: US 6,843,602 B2
(45) Date of Patent: Jan. 18, 2005

(54) HYDRODYNAMIC BEARING UNIT

(75) Inventors: Kazuhiko Koseki, Miyagi-ken (JP);
Makoto Endo, Miyagi-ken (JP);
Noriyuki Kadowaki, Miyagi-ken (JP);
Natsuhiko Mori, Mie-ken (JP);
Tetsuya Kurimura, Mie-ken (JP)

(73) Assignees: NTN Corporation, Osaka-fu (JP);
Tohoku Ricoh Co., Ltd., Miyagi-ken (JP)

( * ) Notice: Subject to any disclaimer, the term of this patent is extended or adjusted under 35 U.S.C. 154(b) by 0 days.

(21) Appl. No.: 09/985,187

(22) Filed: Nov. 1, 2001

(65) Prior Publication Data
US 2002/0051588 A1 May 2, 2002

(30) Foreign Application Priority Data

Nov. 2, 2000 (JP) .................................... 2000-336243

(51) Int. Cl.[7] .............................................. F16C 32/06

(52) U.S. Cl. ...................................... 384/100; 384/107

(58) Field of Search .................................. 384/100, 107, 384/111, 113, 114, 118, 119, 120, 133, 279; 360/99.08

(56) References Cited

U.S. PATENT DOCUMENTS

| | | | | |
|---|---|---|---|---|
| 5,441,386 A | * | 8/1995 | Hsieh | 384/279 |
| RE35,718 E | * | 1/1998 | Nii et al. | 384/133 |
| 6,242,830 B1 | * | 6/2001 | Katagiri | 310/90 |
| 6,250,807 B1 | * | 6/2001 | Mori et al. | 384/100 |
| 6,357,920 B1 | * | 3/2002 | Mori et al. | 384/279 |

* cited by examiner

Primary Examiner—Thomas R. Hannon
(74) Attorney, Agent, or Firm—Arent Fox PLLC

(57) ABSTRACT

A hydrodynamic bearing unit is provided, by which the touch between oil and a sealing member in a housing is prevented to prevent oil leakage. A bearing member made of a sintered lubricant-containing metal is disposed along the inner periphery of the housing and a spindle is supported in a non-contact manner by the hydrodynamic oil pressure that is generated in a bearing gap by the rotation of the spindle. The opening of the housing is sealed by the sealing member. A ventilation path is formed so as to communicate a sealed space enclosed by the distal end of the spindle at the bottom of the housing, the bearing member and the housing with open air. An oil reservoir is formed between the inner periphery of the housing and the outer periphery of the bearing member at the end portion of the opening side of the housing. The oil reservoir is made so as to communicate with the ventilation path.

14 Claims, 8 Drawing Sheets

HYDRODYNAMIC BEARING UNIT

BACKGROUND OF THE INVENTION

1. Field of the Invention

The present invention relates to a hydrodynamic bearing unit having superiority in high-precision rotation, high-speed stability, long durability, low noise and the like, and particularly, to a hydrodynamic bearing unit suitable for supporting a spindle of spindle motor used in information-processing equipment. The "spindle motor used in information-processing equipment" used herein includes a spindle motor for driving an optical disk such as CD-R/RWs and DVD-ROM/RAMs, a magneto-optical disk such as MOs, and a magnetic disk such as HDDs, a polygon scanner motor employed in a laser beam printer (LBP) or a copying machine, and the like.

2. Description of the Related Art

In recent years, a hydrodynamic bearing has been attracting much attention as a bearing for supporting a spindle of a spindle motor or a polygon scanner motor employed in the above-mentioned various information-processing equipment. The hydrodynamic bearing supports a spindle in a non-contact manner by utilizing hydrodynamic effect of lubricating oil generated in a bearing gap. Among those bearings utilizing such effect, as shown in FIG. 7, a hydrodynamic sintered lubricant-containing bearing as a bearing member 52 utilizing a sintered metal impregnated with lubricating oil or lubricating grease has advantageous features of low manufacturing cost and the like. Therefore, the bearing is expected to be used in further broader technological field as a bearing for the above-mentioned spindle motor or polygon scanner motor.

The hydrodynamic sintered lubricant-containing bearing is characterized in that lubricating oil circulates between a bearing gap C and the inner portion of the bearing member 52. Namely, oil oozes from the inner portion of the bearing member 52 due to the temperature increase of bearing unit or the pressure generation followed by the rotation of a spindle 51. Then, the oil is drawn to the bearing face via inclined hydrodynamic grooves 55 followed by the generation of a hydrodynamic effect. The oil is then returned to the inner portion of the bearing member 52 via micro pores of the bearing face by the positive pressure at the bearing face. Thereafter, again the oil oozes from the inner portion of the bearing member 52 to repeat this cycle.

In this case, the oil oozes not only from the inner circumferential surface of the bearing member 52 but also from the other surfaces, for example, an end surface 52a of the bearing member 52 on the opening side of a housing (in this case, the ooze is caused primarily by oil thermal expansion) Therefore, in some cases, the lubricating oil accumulates around the end surfaces 52a during operation. Particularly, when a ventilation path 59 is formed between the inner circumferential surface of a housing 53 and the outer circumferential surface of the bearing member 52 as an air exhaust path used in the assembling process, the oil oozing in a chamfer 52c of the bearing member 52 on the bottom side of the housing or on the surface of the ventilation path 59 also moves upwardly via the ventilation path 59. Accordingly, the amount of the accumulated oil around the end surface 52a on the opening side of the housing is apt to increase. In some cases, a gap 62 (an oil holding gap) between a sealing member 61 provided on the opening of the housing 53 and the end surface 52a of the bearing member 52 is filled with lubricating oil. When such condition occurs, the lubricating oil is in danger of leaking out of the bearing unit via the sealing gap between the inner circumferential surface of the sealing member 61 and the outer circumferential surface of the spindle 51.

To prevent such oil leakage, it is so important to prevent the oil accumulated in the oil holding gap 62 from touching the sealing member 61. Generally, in this kind of bearing, the bearing temperature during operation can be determined corresponding to operation conditions, and therefore, the touch between the oil surface and the sealing member 61 can be prevented by estimating the amount of volume increase due to thermal expansion in advance and subsequently, based on the estimation, designing the space volume of the oil holding gap 62 so as to be capable of accommodating the resultant total amount of oil including the estimated amount of oil volume increase.

However, even when the amount of the oil accumulated in the oil holding gap 62 is within the estimated volume, depending on various primary environmental conditions, the touch between the oil surface and the sealing member possibly occurs. For example, when a bubble remains in the ventilation path 59 after the insertion of spindle in the bearing unit, as shown in FIG. 8A, a bubble B is pushed away via the ventilation path 59 into the opening side of the housing during the operation, which is caused by the above-mentioned movement of the lubricating oil, and then expands wholly in the oil holding gap 62. The expansion of the bubble is performed in a popping manner and at the time of the popping, as shown in FIG. 8B, the bubble B touches the end surface of the sealing member 61, and as a result, the lubricating oil is possibly pushed away along the inner circumferential surface of the housing 53 to touch the end surface of the sealing member 61. Furthermore, depending on the physical orientation of motor during operation (in an inclined posture or horizontally placed posture), as shown in FIG. 9, the lubricating oil is possibly unevenly positioned and thus, the accumulated oil flows and touches the sealing member 61. In addition, such phenomenon as the amount variation of oil to be filled possibly becomes a primary cause of the above-mentioned touch.

When taking into account of those mechanisms described above, as a measure of the prevention of oil leakage, the measure of simply designing the width dimension of the oil holding gap 62 in a suitable value is not sufficient and therefore, as an additional measure to eliminate the above-mentioned complex and primary causes, an improved structure of bearing unit is expected to be developed to securely prevent the touch between oil surface and a sealing member.

SUMMARY OF THE INVENTION

It is therefore an object of the present invention to provide a structure of a bearing unit capable of preventing oil leakage by securely preventing the touch between accumulated oil and a sealing member within a housing.

To achieve the above-described object, a hydrodynamic bearing unit of the present invention is configured to include: a bearing member made of a sintered lubricant-containing metal, having a bearing gap between the bearing member and a spindle to be supported by the bearing member and supporting the spindle in a non-contact manner by a hydrodynamic oil pressure generated in the bearing gap by relative rotation of the bearing member with respect to the spindle; a housing for accommodating the bearing member, having an opening at its one end and being enclosed at its other end; a sealing member for sealing the opening of the housing; and a ventilation path to communicate a sealed space enclosed by the spindle, the bearing member and the housing to the outside, wherein an oil reservoir communicated with the ventilation path is formed at an end portion of an opening side of the housing between an inner periphery of the housing and an outer periphery of the bearing member.

Provision of the oil reservoir makes it possible to accumulate the oil pushed upwardly into the opening side of the housing via the ventilation path or oozing from the bearing member during bearing operation therein. The oil reservoir is formed at the end portion of the opening side of the housing between the inner periphery of the housing and the outer periphery of the bearing member, in other words, is formed in the area extending from the end surface of the bearing member on the opening side of the housing toward the anti-opening side of the housing. Therefore, the surface level of the accumulated oil in the oil reservoir can be lowered toward the anti-opening side of the housing to a larger extent than that of the accumulated oil seen in the conventional bearing unit. Consequently, the distance between the sealing member and the accumulated oil surface is elongated and therefore, the touch between the sealing member and the accumulated oil surface caused by the bubble expansion, the tilted physical orientation of motor during operation or the amount variation of oil to be filled can be prevented.

In this case, the volume of the oil reservoir is preferably designed to be larger than the volume increase of the oil during bearing operation. This makes it possible to lower the surface level of the accumulated oil in the oil reservoir from the end surface of the bearing member on the opening side of the housing toward the anti-opening side of the housing.

The ventilation path can be concretely configured to include a first path formed between the inner periphery of the housing and the outer periphery of the bearing member, and a second path formed between an end surface of the bearing member on the anti-opening side of the housing and a surface of the housing facing the end surface. With such configuration, when inserting the spindle into the bearing member in an assembling process, the air trapped in the space enclosed by the spindle, the bearing member and the housing is released to open air via the second path and the first path in order, whereby the insertion of spindle can be carried out easily. In this case, it is desirable that the first path of the ventilation path is made so as to communicate with the oil reservoir.

The bearing unit may be configured so that a gap is formed between an end surface of the bearing member on the opening side of the housing and the sealing member in an axial direction. This makes the distance between the accumulated oil surface in the oil reservoir and the sealing member further elongated, thereby effectively preventing the touch between the accumulated oil surface and the sealing member.

The above-described hydrodynamic bearing unit can be configured to have a thrust bearing section in the housing for supporting the spindle in a thrust direction. This makes it possible to stably support the spindle even when the unit is applied to the apparatus employing the structure that thrust load is imparted to a spindle.

Furthermore, the above-described hydrodynamic bearing unit can be applied as spindle support means to support a spindle motor for rotating any one of an optical disk, a magneto-optical disk and a magnetic disk by utilizing relative rotation between the spindle and the bearing member, or to support a polygon scanner motor for rotating a polygon mirror by utilizing relative rotation between the spindle and the bearing member.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENTS

Preferred embodiments of the present invention will be described with reference to FIGS. 1 to 5 below.

Figure 1:
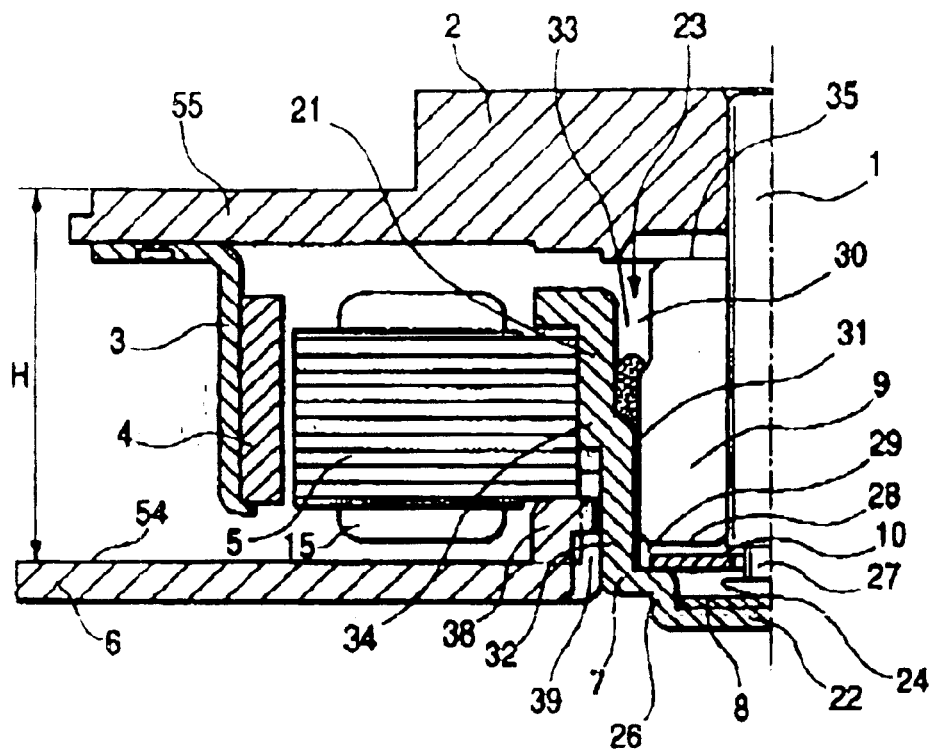
FIG. 1 is a cross sectional view of an LBP polygon scanner motor employing a hydrodynamic bearing unit of the present invention.

FIG. 1 illustrates a cross sectional view of a polygon scanner motor included in a kind of information-processing equipment, a laser beam printer (LBP). The motor comprises a bearing unit U having a bearing member 2 for rotatably supporting a spindle 1 positioned in a vertical orientation, a polygon mirror P mounted near a distal end of the spindle 1, a motor section M mainly composed of a stator $m_s$ and a rotor $m_R$ facing to each other with a gap formed therebetween in an axial direction. The bearing member 2 is fixed to the inner periphery of a housing 3 mounted to a base 4. Reference numerals 6 and 7 denote a rotor hub and a pre-load spring for pressing a polygon mirror P to the rotor hub 6, respectively. When the stator $m_S$ is energized, the rotor $m_R$ rotates in response to the excitation force generated between the stator $m_s$ and the rotor $m_R$ mounted to the rotor hub 6, and in accordance with the rotation of the rotor $m_R$, the spindle 1 and the polygon mirror P rotate. Laser beam from a laser source is incident on the polygon mirror P via a predetermined optical system, and is reflected by the polygon mirror P to scan the surface of a photosensitive drum (not shown).

In the case that the bearing unit U is applied to other spindle motor of information-processing equipment, for example, the spindle motor of a disk drive unit, a disk (such as an optical disk, a magnetic disk or a magneto-optical disk) is to be supported by the spindle 1.

Figure 2:
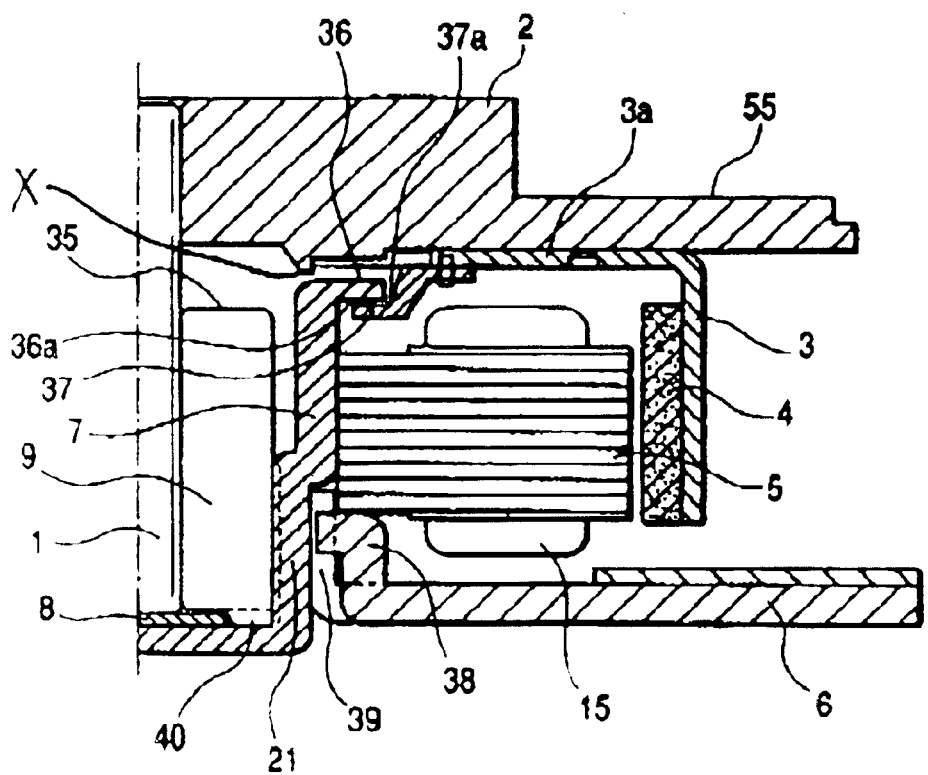
FIG. 2 is a cross sectional view of the hydrodynamic bearing unit shown in FIG. 1.

As shown in FIG. 2, the bearing unit U primarily has the spindle 1, the bearing member 2 to support the spindle 1 and the housing 3 to the inner periphery of which the bearing member 2 is fixed.

The housing 3 is formed into a bottomed cylinder to have an opening at one end portion and to be closed at the other end portion. The housing 3 is fixed to the base 4 in such a manner that the opening is directed upwardly (refer to FIG. 1). Hereinafter, the opening side (upper portion of the drawing) of the housing is referred to as "opening side" and the opposite side (lower portion of the drawing) relative to the opening in the axial direction is referred to as "anti-opening side." At the other end portion of the housing 3 is provided a bottom part 3a. In this case, although the bottom part 3a is integrally formed with the cylindrical portion of the housing 3, it may be configured so that after the bottom part is separately formed as another member, the part is fixed to the other end-opening portion of the cylindrical portion to close the end.

A thrust bearing section 11 for supporting the spindle 1 in a thrust direction is provided on the inner surface of the housing 3 on the anti-opening side. Although the thrust bearing section 11 can, for example, be configured so that the semi-spherical surface of spindle distal end is made in contact with a thrust washer 12 secured to the bottom part 3a, the bearing section may be freely constructed apart from the above-described configuration. At the portion located nearer than the thrust bearing section 11 with respect to the opening side within the housing is provided a retainer part 3b extending to the inner diameter side of the housing. The retainer part 3b is meshed with an end surface 2b of the bearing member 2 on the anti-opening side of the housing in the axial direction, thereby determining the position of the bearing member.

The bearing member 2 is a cylindrical bearing made of a sintered lubricant-containing metal formed by impregnating a sintered metal with lubricating oil or lubricating grease to retain oil in the micro pores of the metal. To form the bearing member, for example, a material made of copper, iron or a mixture thereof as a main component can be available as a sintered metal and preferably, a material including copper in a range of 20 to 90% can be used. On the inner circumferential surface of the bearing member 2, two bearing faces 14 are formed. The bearing faces 14 are disposed separately from each other in the axial direction and face the outer circumferential surface of the spindle 1 via a micro bearing gap C. A plurality of hydrodynamic grooves 15 (herringbone type) are formed in both bearing faces 14. The grooves 15 are inclined in the axial direction and arranged in a circumferential direction. When the hydrodynamic groove 15 is formed inclined in the axial direction, regardless of the type of groove, the groove 15 satisfies the condition of hydrodynamic groove required in the embodiments and therefore, the groove having the shape other than that of the herringbone type, for example, a spiral type of groove can be employed in the present invention. The depth of the hydrodynamic groove 15 is preferably designed to be about 2 to 10 $\mu$m, for example, 3 $\mu$m.

Figure 3A:
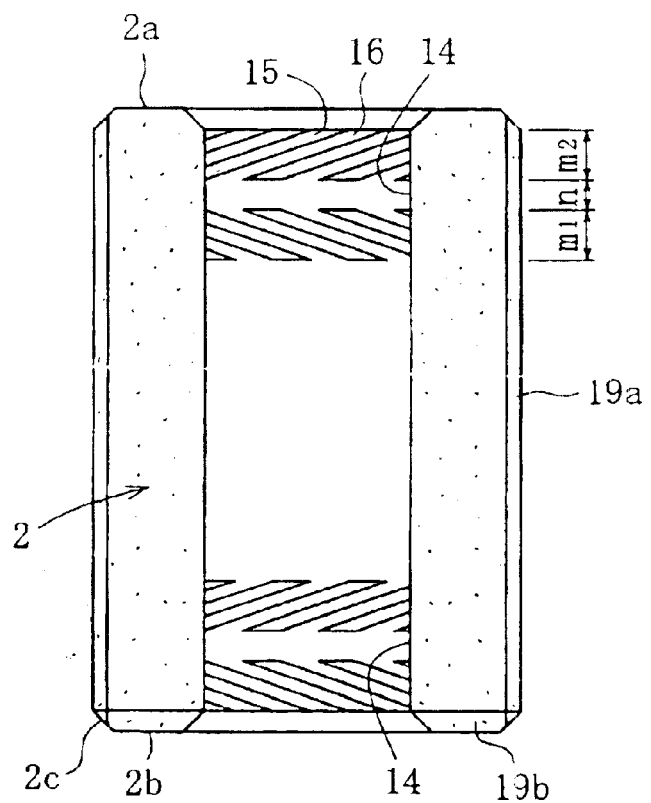
FIGS. 3A and 3B are a cross sectional view and a bottom view of a bearing member used in the hydrodynamic bearing unit shown in FIG. 2.

As shown in FIG. 3A, each of both bearing faces 14 comprises a first groove area m1, a second groove area m2, and an annular flat area n. The first groove area m1 includes hydrodynamic grooves 15 inclined in one direction and arranged in a circumferential direction. The second groove area m2 is formed separately from the first groove area m1 in the axial direction, and includes hydrodynamic grooves 15 inclined in a direction opposite to the inclined direction in the first groove area m1 and arranged in the circumferential direction. The annular flat area n is interposed between the first and second groove areas m1, m2, in which the hydrodynamic grooves 15 of the two groove areas m1, m2 are partitioned by the flat area n to form discontinuous structures. The flat area n and a ridge portion between the hydrodynamic grooves 15 are at the same height level.

In this hydrodynamic bearing unit, the following operation is performed: when the spindle 1 rotates, the pressure (negative pressure) is generated and the oil expands its volume in accordance with the pressure development and temperature increase; and then, the oil (lubrication oil or base oil of lubricating grease) included in the bearing member 2 oozes from the surface of the bearing member 2; and thereafter, the hydrodynamic grooves 15 serve to draw the oil to the bearing gap C between the bearing face 14 and the outer circumferential surface of the spindle 1. The oil drawn to the bearing gap C forms a lubricating oil film on the bearing face 14 and thus, supports the spindle 1 in a non-contact manner. When the positive pressure is generated on the bearing face 14, since pores (opening pore portions: indicating the portions where micro pores of a porous structure are open on the surface of the bearing face) are formed in the surface of the bearing face 14, the oil is drawn to the inner portion of the bearing member 2 for circulation. However, as new oil is supplied one after another on and squeezed onto the bearing face 14, the oil film pressure and the rigidity of the oil film are maintained to be high. In this case, as the stable oil film is continuously formed, the high-precision rotation can be obtained, and spindle run out, NRRO (Non Repeatable Run-Out) and jitter can be lowered. Furthermore, as the spindle 1 and the bearing member 2 rotate in a non-contact manner, in addition to the low noise, the low manufacturing cost can be achieved.

In the assembling process of the above-described hydrodynamic bearing unit U, usually, the spindle 1 is inserted into the inside of the bearing member 2 under the condition that the bearing member 2 is secured to the housing 3. In some cases, before the insertion of the spindle 1, oil is lubricated within the housing 3 in advance to improve the lubricity of spindle. However, since the bearing gap C between the bearing member 2 and the spindle 1 is only about a few $\mu$m, air is confined between the distal end of the spindle and the upper surface of the lubricated oil and loses the path to be exhausted, resulting in the difficulty of the insertion of spindle 1.

Figure 3B:
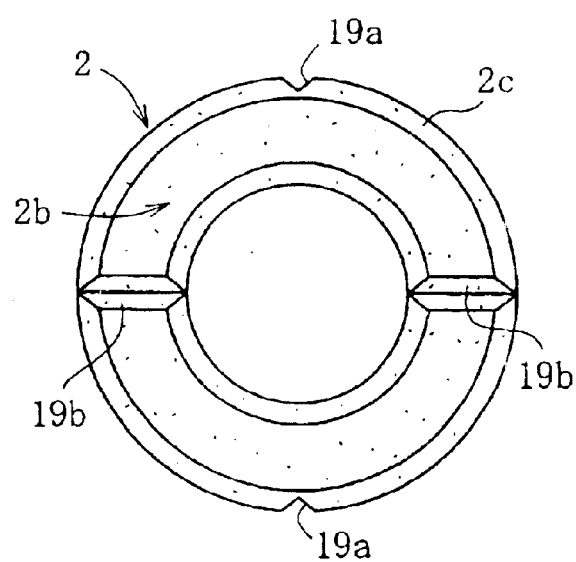

To solve the above-mentioned problem, in the bearing unit U of the present invention, as shown in FIGS. 1 and 2, a ventilation path 19 is formed so as to communicate an enclosed space 18 enclosed by the spindle 1, the bearing member 2 and the housing 3 on the anti-opening side of the housing 3 with the outside air. The ventilation path 19 comprises a first path 19a having openings at both end surfaces 2a and 2b of the bearing member 2, and a second path 19b making the first path 19a and the enclosed space 18 communicate with each other. The first path 19a is formed between the outer circumferential surface of the bearing member 2 and the inner circumferential surface of the housing 3, and the second path 19b is formed between the end surface 2b of the bearing member 2 on the anti-opening side of the housing 3 and the portion (the retainer part 3b) of the housing 3 facing the end surface 2b. In this embodiment, as shown in FIGS. 3A and 3B and as one of the structures of ventilation path, the ventilation path 19 is configured so that the first path 19a is composed of two axial grooves cut in the outer peripheral surface of the bearing member 2 and the second path 19b is composed of two radial grooves cut in the end surfaces 2b of the bearing member 2 on the anti-opening side of the housing in two radial directions. It should be noted that other than the above-described structures of ventilation path, for example, the ventilation path 19 can be configured so that the path 19a is formed in the inner circumferential surface of the housing 3 and the path 19b is formed in the end surface of the retainer part 3b. As shown in FIG. 3B, although the circumferential angle difference between the first path 19a and the second path 19b is made to be 90 degrees and both paths are viewed as if they are spatially isolated to each other, the both paths 19a and 19b are in flow communication with each other via a chamfer 2c formed along the outer diameter side of the end surface 2b of the bearing member 2.

As shown in FIGS. 1 and 2, the opening portion of the housing 3 at one end thereof is sealed by a ring-shaped sealing member 21. The sealing member 21 is made of for example, a resin (such as polyamide) or a metal (includes a sintered metal) and fixed to the opening portion of the housing 3 at one end thereof by using such methods as a bonding or a press-fitting. The sealing member 21 is a non-contact sealing member formed so as to interpose a narrow sealing gap between the inner circumferential surface of the sealing member and the outer circumferential surface of the spindle 1, and the capillary phenomenon caused in the sealing gap prevents the oil from leaking out of the housing 3. In this case, when the outer circumferential surface of the spindle 1 facing the inner circumferential surface of the sealing member 21 is at least coated-by an oil-repellent agent, the oil leakage can be more effectively prevented. Although it is desirable that a non-contact type seal is used for the sealing member 21 to avoid such phenomena as torque increase and/or torque fluctuation, when these phenomena do not become so serious problems for the unit, a contact type seal also can be applied to the sealing member. The sealing member 21 is disposed so that a gap 22 (oil holding gap) is formed between the end portion 2a of the bearing member 2 on the opening side of the housing 3 and the sealing member 21.

As shown in FIGS. 1 and 2, there is provided an annular oil reservoir 23 in an area extending from the outer diameter side of the opening side end portion 2a of the bearing member 2 toward the anti-opening side, in other words, in an end portion of the opening side of the housing between the inner circumferential surface of the housing and the outer circumferential surface of the bearing member 2. The oil reservoir 23 can be formed by partially removing at least one of the inner peripheral portion of the housing 3 and the outer peripheral portion of the bearing member 2, and in this embodiment, as an example of oil reservoirs, the oil reservoir 23 is formed by partially removing the inner peripheral portion of the housing 3. The portion of the oil reservoir 23 on the opening side of the housing is open toward the oil holding gap 22 and the first path 19a is open toward the inner diameter side of the oil reservoir 23.

During the bearing operation, the oil oozing from the bearing member 2 is pushed upwardly via the ventilation path 19 and then accumulates in the oil reservoir 23. In this operation, compared with the structure of the conventional bearing unit, when the oil accumulates in the oil reservoir 23, the accumulated oil surface is made lowered toward the anti-opening side of the housing to an extent equivalent to the volume of the oil reservoir 23 and therefore, the distance between the accumulated oil surface and the end surface of the sealing member 21 can be elongated. Accordingly, when the volume of the oil reservoir 23 is designed in advance so as to become larger than the amount of oil volume increase (difference of the oil accumulated outside the bearing member 2 between the oil volume under the stop of bearing operation and the maximum oil volume reached from the beginning aspect to the stable aspect of bearing operation) during bearing operation, the accumulated oil surface under bearing operation can be made located nearer than the end surface 2a of the bearing member 2 with respect to the anti-opening side of the housing. Furthermore, since the accumulated oil in the oil reservoir 23 is retained within the reservoir by the capillary force between the inner periphery of the housing 3 and a chamfer 2d on the outer diameter side of the end surface 2a of the bearing member 2, it is difficult for the oil to flow out into the side of the oil holding gap 22 and even when the oil temporarily flows out into the oil holding gap 22, the distance between the end surface 2a of the bearing member 2 and the sealing member 21 is securely maintained to be enough long, whereby the touch between the accumulated oil and the sealing member 21 can be securely prevented.

Figure 4:
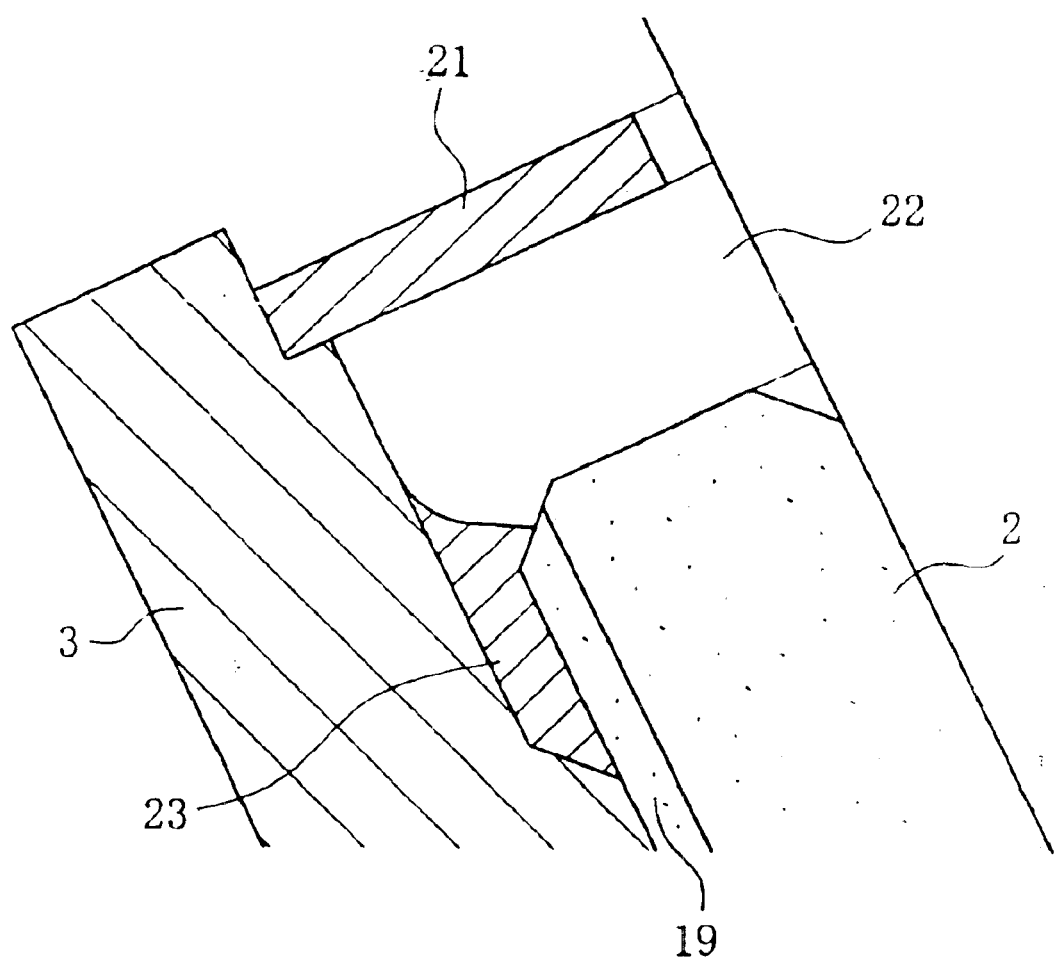
FIG. 4 is an enlarged primary sectional view of the hydrodynamic bearing unit whose physical orientation during operation is tilted.

In this case, the expansion of bubble remained in the ventilation path 19 is carried out at the position nearer than the end surface 2a of the bearing member 2 with respect to the anti-opening side of the housing and therefore, the touch between the bubble and the sealing member 21 can be prevented. Furthermore, as shown in FIG. 4, even when the physical orientation of motor during operation is tilted, the touch between the deviated oil and the sealing member 21 can be prevented and further, even when the amount of oil injected into the bearing unit is varied, the touch between the oil and the sealing member 21 can be prevented. When an operation is stopped, in accordance with the temperature drop, the lubricating oil outside the bearing member 2 is collected within the bearing member 2 and the collection of oil is carried out quickly since the contact area between the lubricating oil and the bearing member 2 can be secured broad enough because of the existence of the oil reservoir 23.

As mentioned above, according to the present invention, even when the various primary causes of the touch between the accumulated oil and the sealing member 21 other than the oil thermal expansion may occur, the touch between the aforementioned two materials can be securely prevented and therefore, the leakage of oil from the sealing gap can be prevented, whereby the bearing function of bearing unit can be kept stably for a long time.

If the conventional bearing unit without the oil reservoir 23 is modified to be capable of avoiding the touch between the oil and the sealing member 21, the modification is carried out only by elongating the oil holding gap 22 in the axial direction and therefore, the bearing unit is inevitably enlarged in the axial direction. In contrast to this result of the modification, according to the present invention, the undesirable result seen in the modification never occurs and therefore, the bearing unit can be realized in small size. Furthermore, although in the assembling process of conventional bearing unit, the defoaming has to be carried out before the spindle insertion process to remove bubbles included in the lubricating oil, the bearing unit of the present invention does not need such an elaborate process for the following reason. That is, bubbles are pushed upwardly via the ventilation path 19 into the oil reservoir 23 and expand therein while avoiding contact with the sealing member 21, whereby the elaborate process such as defoaming becomes unnecessary and the assembling cost of bearing unit can be reduced.

Figure 5A:
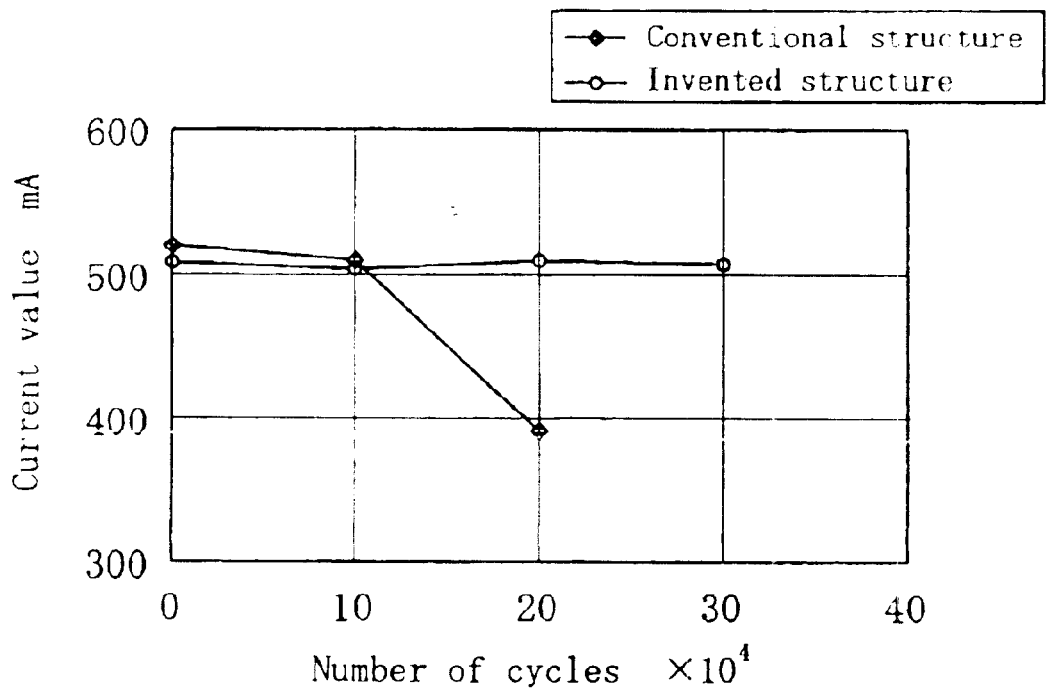
FIGS. 5A and 5B illustrate graphs of experimental results of the hydrodynamic bearing unit.
Figure 5B:
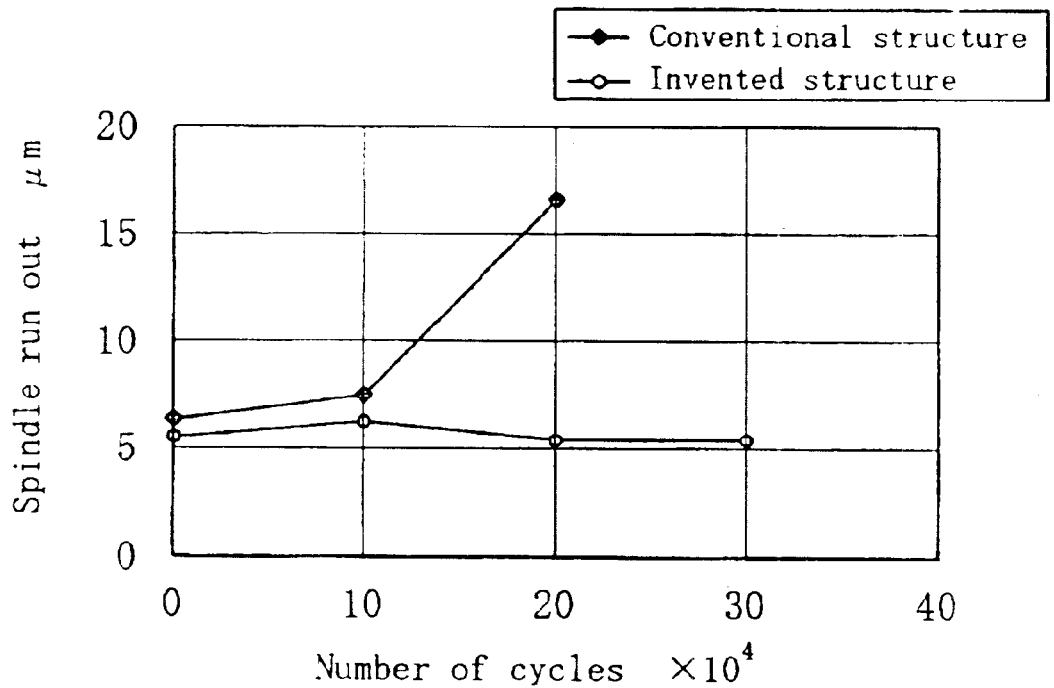
Figure 7:
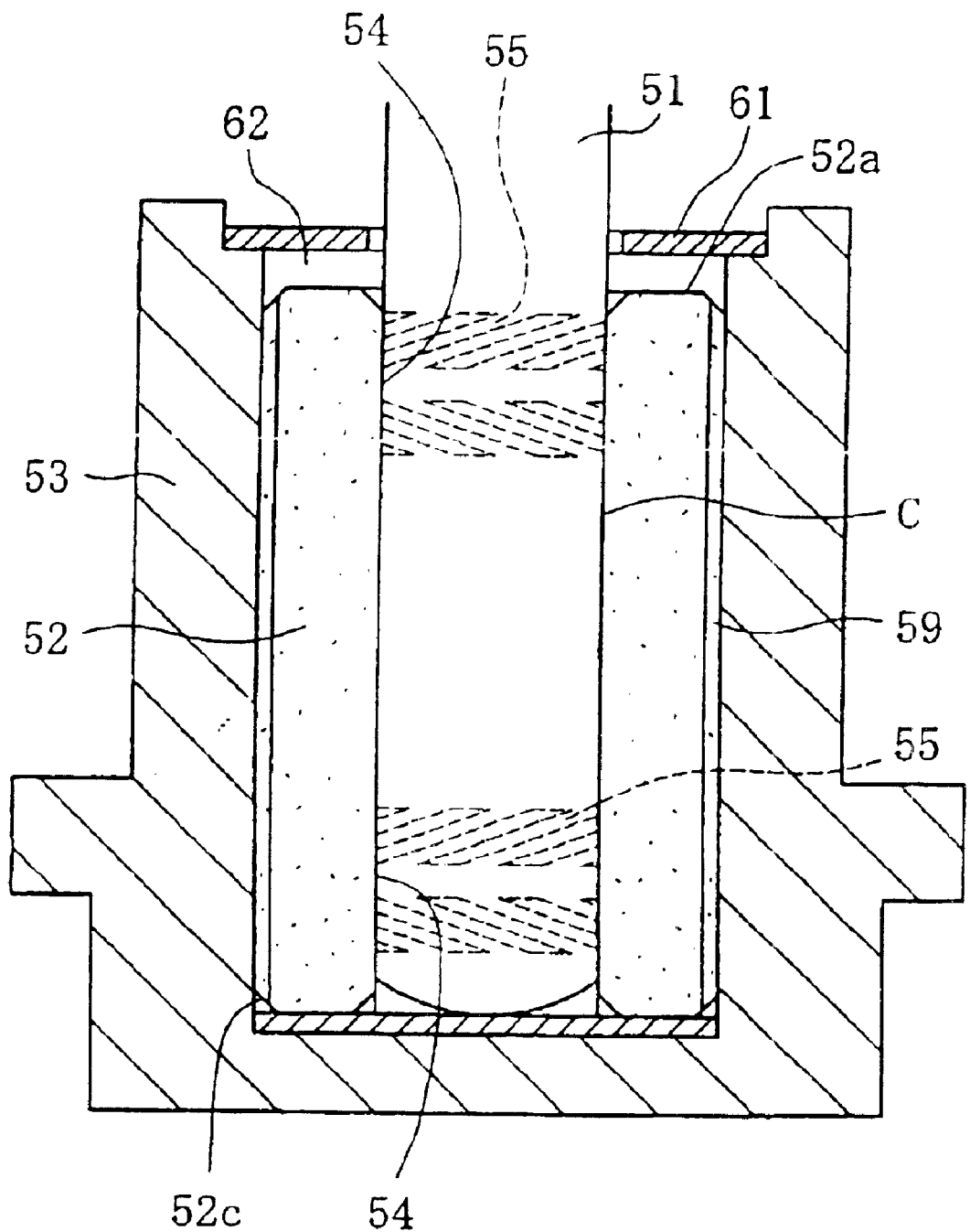
FIG. 7 is a cross sectional view of a conventional hydrodynamic bearing unit.
Figure 8B:
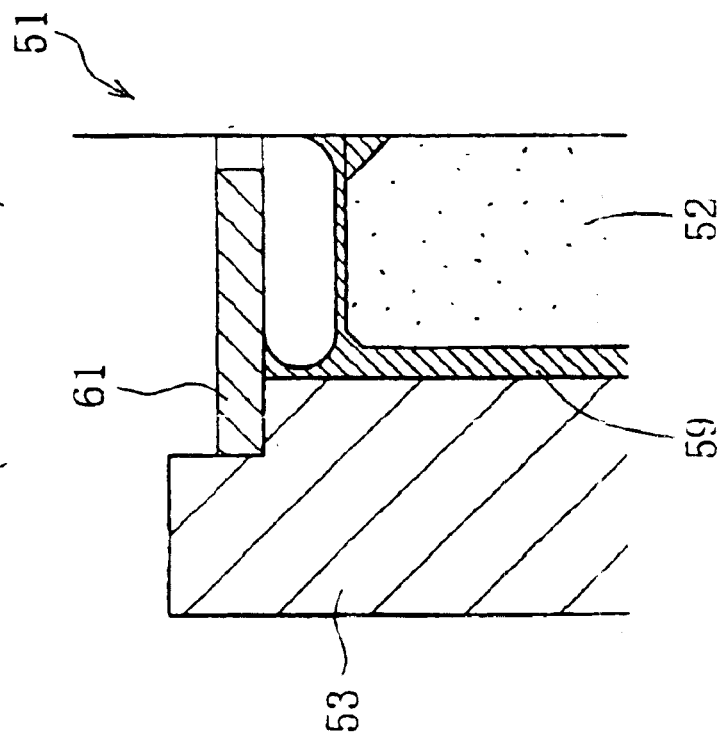
FIGS. 8A and 8B are an enlarged primary sectional view illustrating the expansion process of a bubble seen in the conventional hydrodynamic bearing unit.
Figure 8A:
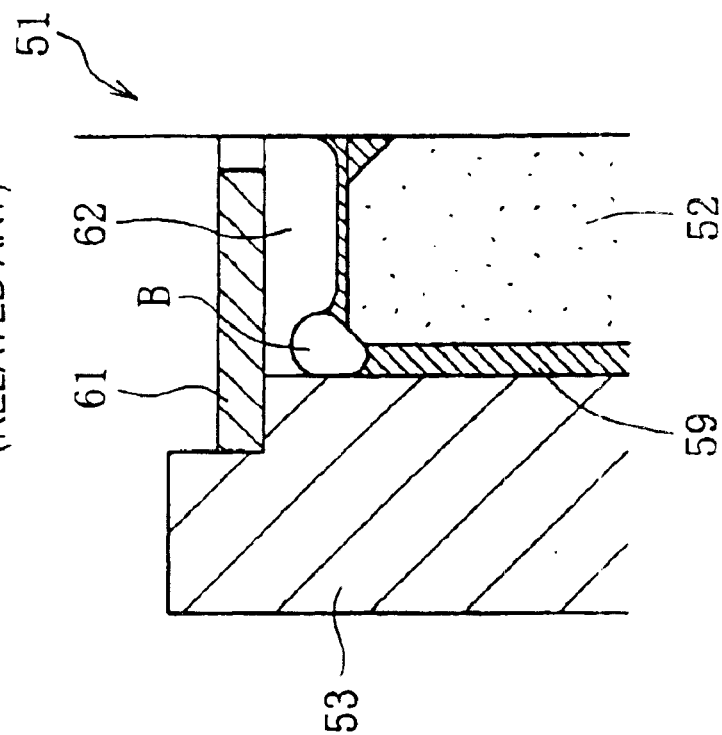
Figure 9:
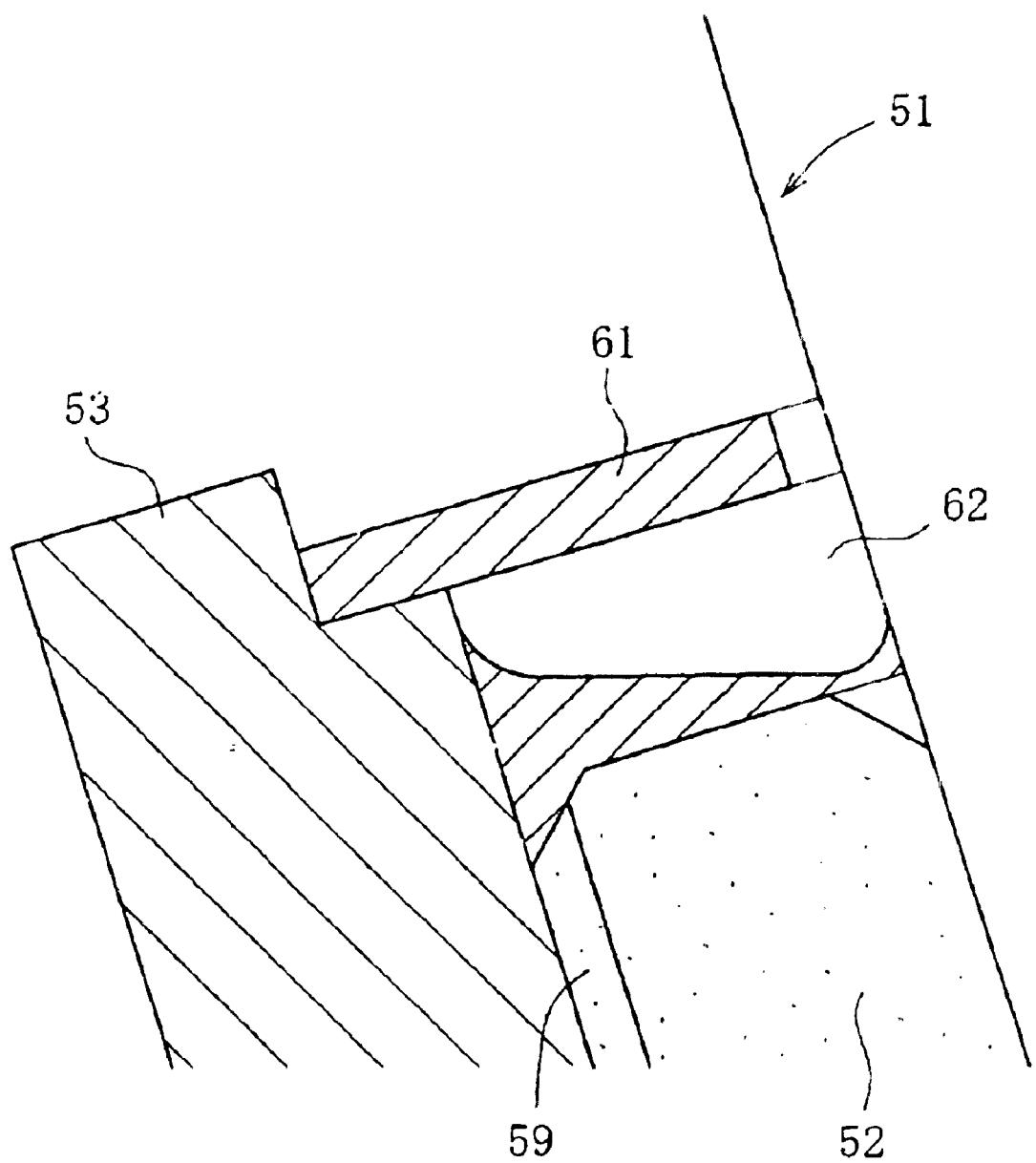
FIG. 9 is an enlarged primary sectional view of the conventional hydrodynamic bearing unit whose physical orientation during operation is tilted.

FIG. 5 illustrates graphs of the result of the lubricating oil leakage test with the passage of operating time in the conventional bearing unit (refer to FIG. 7) and the invented bearing unit (refer to FIG. 2). The test conditions are as follows:

Rotational speed: 30,000 rpm
Atmospheric temperature: 60° C.
Motor physical orientation: tilt angle: 40°
Test time: 300,000 cycles
Operating condition: ON/OFF cycle time (36 seconds per cycle)
Measurement items: current value, plane run out When the lubricating oil leaks, the agitating resistance within the bearing unit U reduces and therefore, the motor current temporarily reduces followed by the deterioration of plane run out tolerance. Accordingly, by measuring the current value and the plane run out with the passage of time, it is considered that the determination of lubricating oil leakage can be indirectly carried out. As shown in FIGS. 5A and 5B, in the conventional bearing unit, at the time of 200,000 ON/OFF cycles completed, the current value rapidly reduces and the amplitude of plane run out is also enlarged. At this point, when the rotor was taken out, the mark of dispersed lubricating oil on the inner circumferential surface of the rotor was detected and the oil leakage was thereby confirmed. On the other hand, in the structure of the present invention, the changes of current value and plane run out value even after the passage of 300,000 cycles are not seen accompanied by the confirmation of high lubricating capability being maintained.

Figure 6:
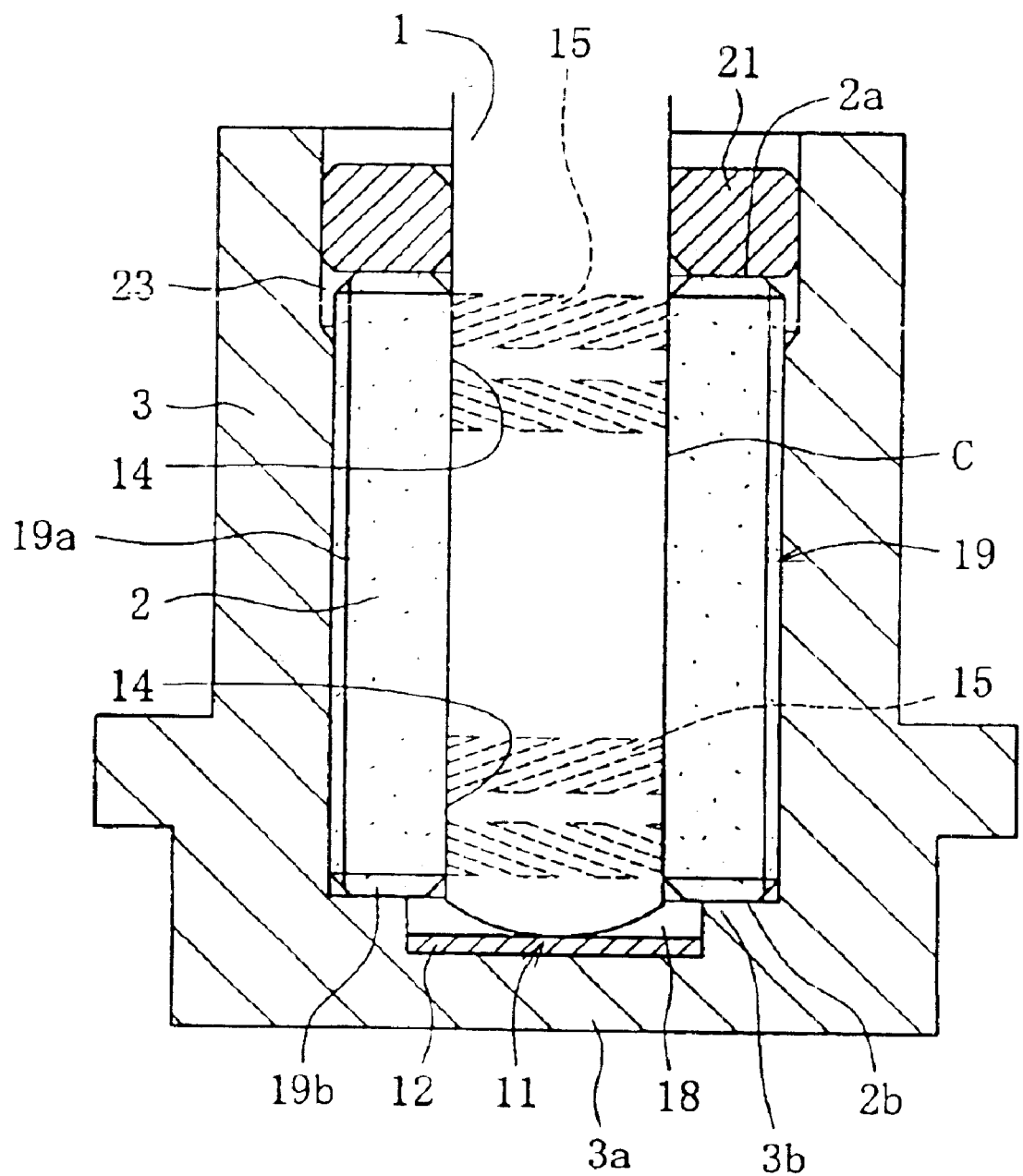
FIG. 6 is a cross sectional view of a hydrodynamic bearing unit of another embodiment.

FIG. 6 illustrates another embodiment of the present invention in which a sealing member 21 and an end surface 2a of a bearing member are made to be tightly in contact with each other to omit an oil holding gap 22. Also in this case, by forming an oil reservoir 23 in an end portion of the opening side of a housing 3 between the inner circumferential surface of the housing 3 and the outer circumferential surface of a bearing member 2, and simultaneously, making the oil reservoir communicate with a ventilation path 19, the oil leakage can be prevented. The structure of this embodiment other than the above-described structure is the same as that of the embodiment illustrated in FIGS. 1 and 2, and therefore, the corresponding parts and portions are indicated by the same numerals as that of the prior embodiment and the explanation for the corresponding ones is omitted.

As described above, according to the present invention, the touch between accumulated oil in the opening side of a housing and a sealing member can be prevented and therefore, the oil leakage can be securely prevented. Thus, the bearing unit can perform its normal operation stably for a long time. Furthermore, the gap between the sealing member and the end surface of a bearing member can be reduced and therefore, the dimension of bearing unit in the axial direction also can be reduced. The assembly cost of bearing unit can also be lowered.

While there has been described what are at present considered to be preferred embodiments of the invention, it will be understood that various modifications may be made thereto, and it is intended that the appended claims cover all such modification as fall within the true spirit and scope of the invention.

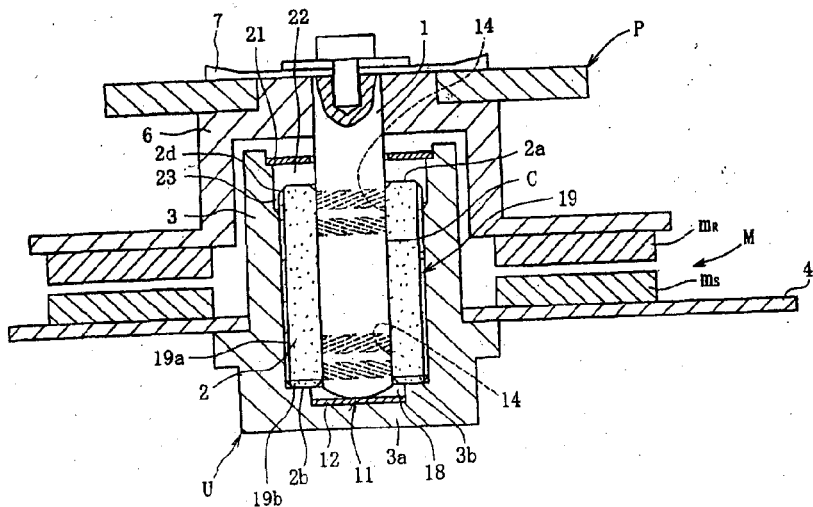

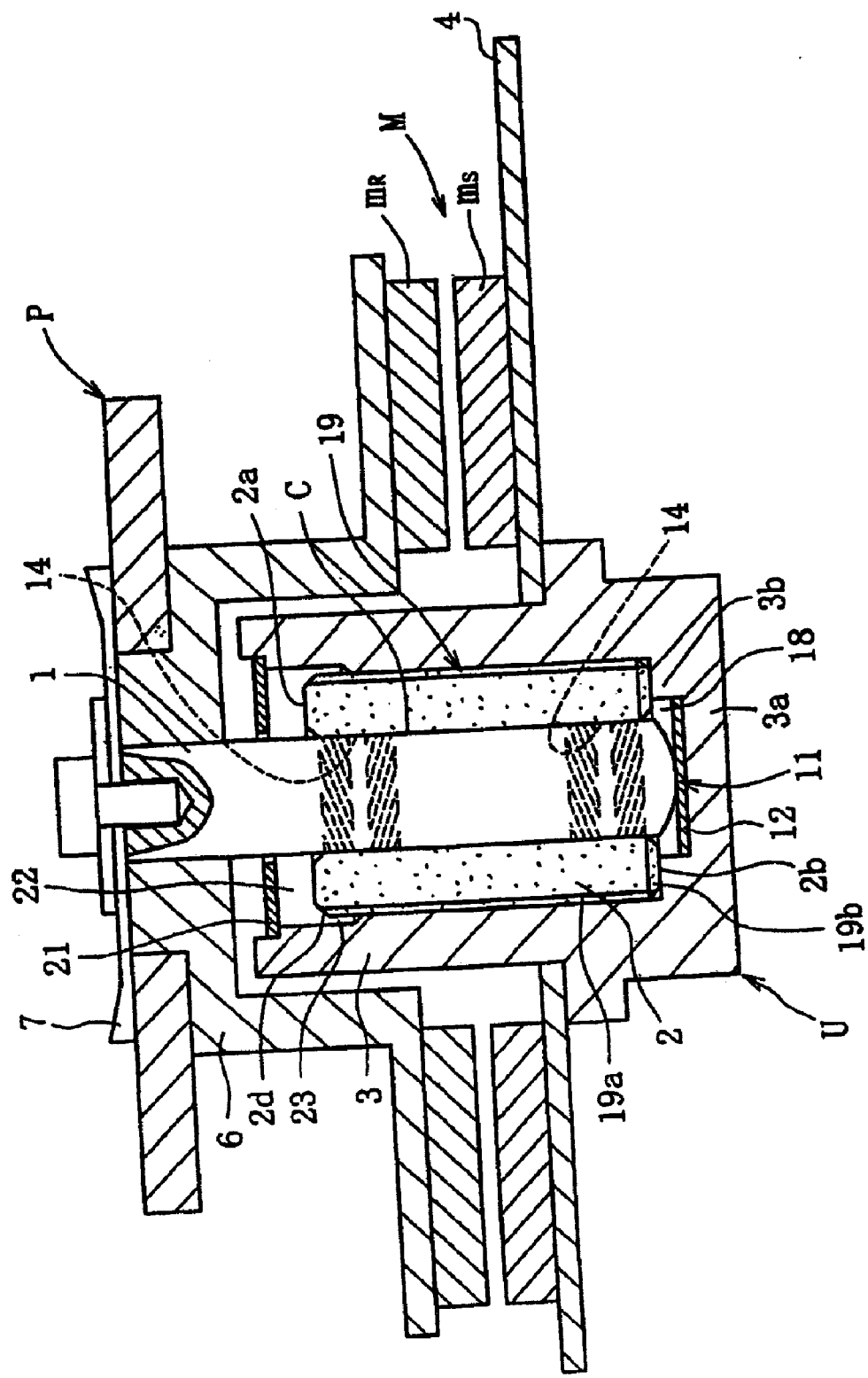

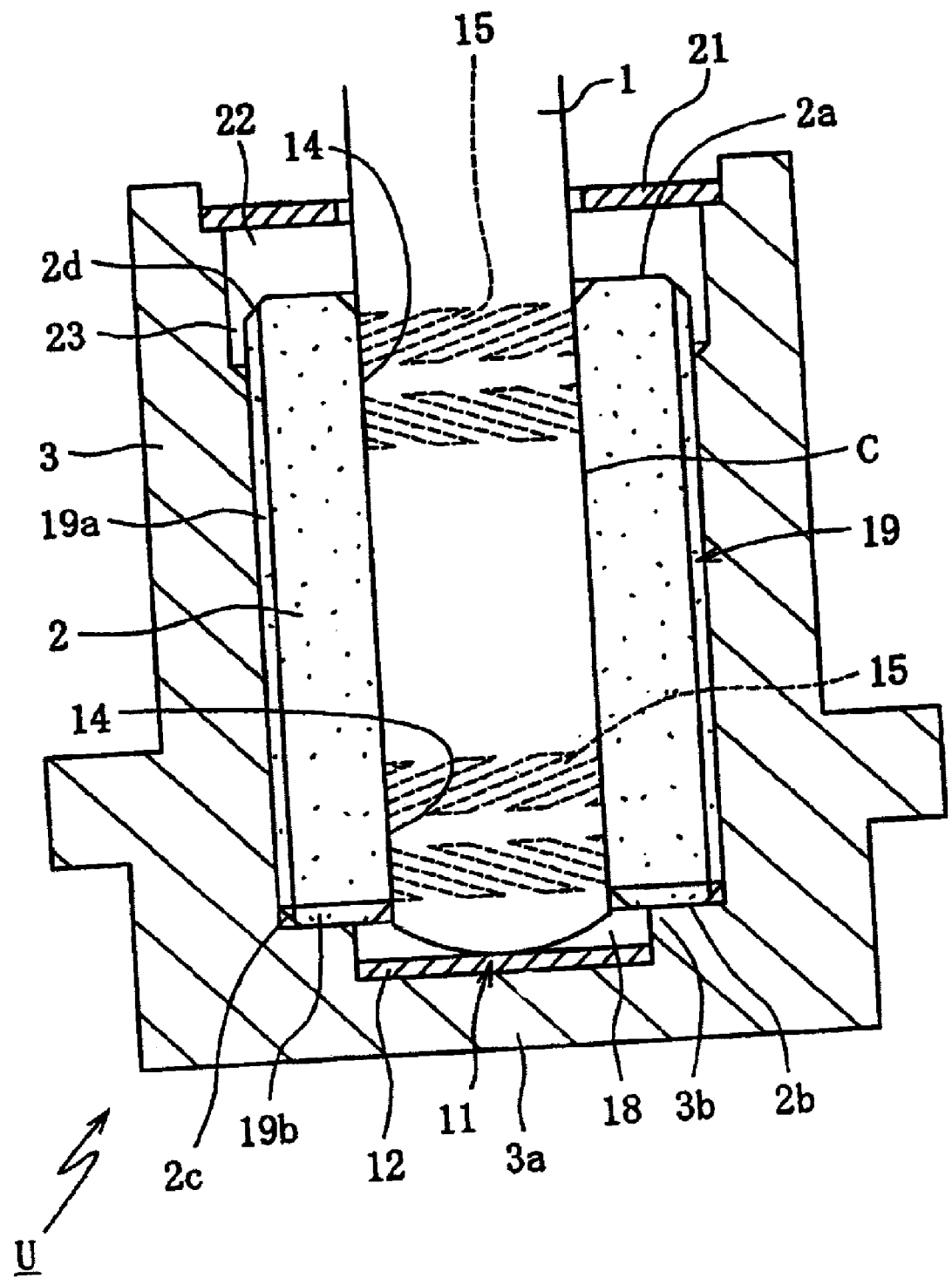

What is claimed is:

1. A hydrodynamic bearing unit comprising:
   a bearing member made of a sintered lubricant-containing metal, having a bearing gap between said bearing member and a spindle to be supported by said bearing member and supporting said spindle in a non-contact manner by a hydrodynamic oil pressure generated in said bearing gap by relative rotation of said bearing member with respect to said spindle;
   a housing for accommodating said bearing member, having an opening at its one end and being enclosed at its other end, wherein the enclosed end of the housing contacts an end surface of the bearing member;
   a sealing member for sealing said opening of said housing, wherein said sealing member is fixed to said opening of said housing; and
   a ventilation path to communicate a sealed space enclosed by said spindle, said bearing member and said housing to the outside, wherein said ventilation path comprises a first path between said inner periphery of said housing and said outer periphery of said bearing member, and a second path formed between the end surface of the bearing member and the enclosed end of said housing contacting the end surface of the bearing member,
   wherein an oil reservoir communicating with said ventilation path is formed at an end portion of an opening side of said housing between an inner periphery of said housing and an outer periphery of said bearing member.

2. The hydrodynamic bearing unit according to claim 1, wherein said first path is communicated with said oil reservoir.

3. The hydrodynamic bearing unit according to claim 1, wherein a volume of a said oil reservoir is designed to be larger than a volume increase of the oil during operation of said bearing unit.

4. The hydrodynamic bearing unit according to claim 3, wherein a gap is formed between an end surface of said bearing member on said opening side of said housing and said sealing member in an axial direction.

5. The hydrodynamic bearing unit according to claim 3, wherein a thrust bearing section is provided in said housing to support said spindle in a thrust direction.

6. A spindle motor comprising the hydrodynamic bearing unit as set forth in any one of claims 3 to 5, said hydrodynamic bearing unit being configured to rotate any one of an optical disk, a magneto-optical disk and a magnetic disk by relative rotation between said spindle and said bearing member.

7. A polygon scanner motor comprising the hydrodynamic bearing unit as set forth in any one of claims 3 to 5, said hydrodynamic bearing unit being configured to rotate a polygon mirror by relative rotation between said spindle and said bearing member.

8. The hydrodynamic bearing unit according to one of claims 1 to 2, wherein a gap is formed between an end surface of said bearing member on said opening side of said housing and said sealing member in an axial direction.

9. A spindle motor comprising the hydrodynamic bearing unit according to claim 8, said hydrodynamic bearing unit being configured to rotate any one of an optical disk, a magneto-optical disk and a magnetic disk by relative rotation between said spindle and said bearing member.

10. A polygon scanner motor comprising the hydrodynamic bearing unit according to claim 8, said hydrodynamic bearing unit being configured to rotate a polygon mirror by relative rotation between said spindle and said bearing member.

11. The hydrodynamic bearing unit according to claim 3, wherein an outer circumferential surface of the spindle facing an inner circumferential surface of the sealing member is at least coated by an oil-repellent agent.

12. The hydrodynamic bearing unit according to claim 1, wherein the first path is an axial groove formed in the outer periphery of the bearing member and the second path is a radial groove formed in the end surface of the bearing member.

13. The hydrodynamic bearing unit according to claim 1, wherein the first path is an axial groove formed in the inner periphery of the housing and the second path is a radial groove formed in the enclosed end of the housing opposite the end surface of the bearing member.

14. The hydrodynamic bearing unit according to claim 1, wherein the housing comprises a retainer part that engages with the end surface of the bearing member in an axial direction, and the second path is formed between the end surface of the bearing member and the retainer part of the housing.

* * * * *

UNITED STATES PATENT AND TRADEMARK OFFICE
CERTIFICATE OF CORRECTION

PATENT NO. : 6,843,602 B2
DATED : January 18, 2005
INVENTOR(S) : Kazuhiko Kosekl et al.

It is certified that error appears in the above-identified patent and that said Letters Patent is hereby corrected as shown below:

The title page should be deleted and substitute therefore the attached title page.

Delete drawing sheets 1-2 and substitute therefore the drawing sheets consisting of Figs. 1-2 as shown on the attached pages.

Signed and Sealed this

Eighteenth Day of October, 2005

JON W. DUDAS
*Director of the United States Patent and Trademark Office*

(12) United States Patent
Koseki et al.

(10) Patent No.: US 6,843,602 B2
(45) Date of Patent: Jan. 18, 2005

(54) HYDRODYNAMIC BEARING UNIT

(75) Inventors: Kazuhiko Koseki, Miyagi-ken (JP);
Makoto Endo, Miyagi-ken (JP);
Noriyuki Kadowaki, Miyagi-ken (JP);
Natsuhiko Mori, Mie-ken (JP);
Tetsuya Kurimura, Mie-ken (JP)

(73) Assignees: NTN Corporation, Osaka-fu (JP);
Tohoku Ricoh Co., Ltd., Miyagi-ken (JP)

( * ) Notice: Subject to any disclaimer, the term of this patent is extended or adjusted under 35 U.S.C. 154(b) by 0 days.

(21) Appl. No.: 09/985,187

(22) Filed: Nov. 1, 2001

(65) Prior Publication Data
US 2002/0051588 A1 May 2, 2002

(30) Foreign Application Priority Data
Nov. 2, 2000 (JP) .................................... 2000-336243

(51) Int. Cl.$^7$ ................................................ F16C 32/06

(52) U.S. Cl. ..................................... 384/100; 384/107

(58) Field of Search ........................ 384/100, 107, 384/111, 113, 114, 118, 119, 120, 133, 279; 360/99.08

(56) References Cited

U.S. PATENT DOCUMENTS

| | | | |
|---|---|---|---|
| 5,441,386 A | * | 8/1995 | Hsieh .......................... 384/279 |
| RE35,718 E | * | 1/1998 | Nii et al. ....................... 384/133 |
| 6,242,830 B1 | * | 6/2001 | Katagiri ........................ 310/90 |
| 6,250,807 B1 | * | 6/2001 | Mori et al. ................... 384/100 |
| 6,357,920 B1 | * | 3/2002 | Mori et al. ................... 384/279 |

* cited by examiner

Primary Examiner—Thomas R. Hannon
(74) Attorney, Agent, or Firm—Arent Fox PLLC

(57) ABSTRACT

A hydrodynamic bearing unit is provided, by which the touch between oil and a sealing member in a housing is prevented to prevent oil leakage. A bearing member made of a sintered lubricant-containing metal is disposed along the inner periphery of the housing and a spindle is supported in a non-contact manner by the hydrodynamic oil pressure that is generated in a bearing gap by the rotation of the spindle. The opening of the housing is sealed by the sealing member. A ventilation path is formed so as to communicate a sealed space enclosed by the distal end of the spindle at the bottom of the housing, the bearing member and the housing with open air. An oil reservoir is formed between the inner periphery of the housing and the outer periphery of the bearing member at the end portion of the opening side of the housing. The oil reservoir is made so as to communicate with the ventilation path.

14 Claims, 8 Drawing Sheets